United States Patent [19]
Del Mar et al.

[11] Patent Number: 6,022,604
[45] Date of Patent: Feb. 8, 2000

[54] OPTICAL DISK MASTERING SYSTEM

[75] Inventors: Bruce E. Del Mar, Laguna Beach; Robert L. Cubit, Westminster, both of Calif.

[73] Assignee: ODME, Netherlands

[21] Appl. No.: 09/008,104

[22] Filed: Jan. 16, 1998

[51] Int. Cl.$^7$ ...................................................... B32B 3/00
[52] U.S. Cl. ........................ 428/64.1; 428/64.2; 428/412; 428/913; 430/270.11; 430/495.1; 430/945
[58] Field of Search ................................. 428/64.1, 64.2, 428/412, 913; 430/270.11, 495.1, 945

[56] References Cited

U.S. PATENT DOCUMENTS

| | | | |
|---|---|---|---|
| 5,099,469 | 3/1992 | Dobbin et al. | 369/88 |
| 5,283,159 | 2/1994 | Norton et al. | 430/275 |
| 5,304,455 | 4/1994 | Van Liempd | 430/270 |
| 5,741,627 | 4/1998 | Cubit et al. | 430/321 |

*Primary Examiner*—Elizabeth Evans
*Attorney, Agent, or Firm*—W. D. English

[57] ABSTRACT

The invention discloses a method and an apparatus for creating an elementary optical disc master with but a single layer to be applied to a disc substrate to form pits having ideal shapes and without berm buildup. These ideally shaped pits are improvements in the technology of disc mastering, due to the manufacturing and data playback advantages that are inherent in the ideally shaped pits. An optically active lamina consisting of a dye polymer solution of nitrocellulose and a increased dye additive is spin coated directly to a pregrooved polycarbonate substrate to enable the recording of data on the disc by laser means in the form of pits. The pits are created by having a data modulated laser focusing on the optically active lamina which reacts to the irradiation causing a pit to be formed. The resulting pit more often than not possesses a residual raised berm area surrounding the pit, in what is considered to be a less than ideal shape for a pit. The residual berm, however, is eliminated by an additional process and step of passing the recently recorded disc under a UV illumination source before application of a final conductive layer to the disc.

9 Claims, 9 Drawing Sheets

OPTICAL DISK MASTERING SYSTEM

BACKGROUND OF THE INVENTION

1. Field of the Invention

This invention relates to the art of recording data on optical discs, and more specifically toward obtaining diminished fabrication processes, superior laser tracking, improved pit geometry, and berm deletion in optical recordings created within the art of optical disc mastering.

2. Description of the Prior Art

Various methods have been employed in recording data on optical discs, wherein, data is recorded by having a laser burn pits into an optical disc. Optical disc (OD) masters are articles from which prerecorded mass produced consumer OD's are subsequently molded. The master is a first article in the OD manufacturing process having data or information recorded on a disc or platter that can be read by optical means. All subsequent OD manufacturing and duplication processes transfer that identical form, format and data from the original first article by various means including: vacuum deposition; electroforming and plating; and injection molding processes.

Past techniques for producing masters combined existing technologies from various industries. The most prominent of these techniques is the photo resist concept of the semiconductor industry. The master had formed on it a series of pits by photo etching means. The pits serve to optically record information. The pits conventionally form a spiral line or track starting at a central portion of the disc and continuing to the outer periphery of the disc. Conventionally, the pits are approximately 0.6 um ($10^{-6}$ meters) wide, 0.9 to 3.3. um long, 0.12 um deep, and are separated from neighborhood tracks, on either side thereof, by 1.6 um center to center.

To record using the photoresist technique, a lamina of photoresist material is spun upon a very smooth, polished, large circular plate of glass. The glass plate with photoresist lamina is then placed in an oven to cure the photoresist. The cured, photoresist coated, glass plate is next set upon a massive turntable which is caused to spin. A data modulated laser optical system is focused on the glass plate, while suspended by a relatively large and complex translational mechanism, to cause the focused spot laser to move very gradually, at a steady radial rate, outwardly from the center of the spinning glass plate while concomitantly radiating the surface of the plate. The effect being to produce a spiral track of data in the photoresist material. The turntable spins at either a constant angular velocity (CAV) or a constant linear velocity (CLV) depending on need while any point on the surface of the plate is being radiated by a laser. This process is referred to as mastering, wherein, data is recorded by creating pits in the optical disc from the exposure to laser light along the spiral path as the plate rotates. After the desired data has been recorded in the photoresist lamina, the plate is placed in at least one bath of developing solution, typically a process that requires multiple steps, whereby, the exposed areas in the photoresist are etched out leaving a series of pits. The glass plate with etched photoresist is then oven dried, followed by metalization of the photoresist lamina by vacuum deposition of a thin conductive lamina of metal thereon, which yields the desired master. The master is finally subjected to an analysis and validation process prior to electroforming to make a stamper and replication.

The foregoing type of mastering system is quite expensive in terms of capital equipment involved, labor, space, sensitivity to motion and shock, time and costs. Operating costs to produce a single master can be relatively expensive.

As an alternative to the photoresist mastering system, another technique, known as a non-photo resist (NPR), or direct offset method, utilizes what is referred to as a dry process formula (DPF). This process incorporates the use of a material which undergoes ablation when exposed to a high power laser, thereby, forming the desired pit. This process has further brought forth a number of advantages over the photoresist process. These advantages include a reduction in the process steps by deleting, developing and curing steps, which results in a less costly procedure and much shorter completion time, and the ability to monitor the quality of the disc concurrent with the mastering process of recording data thereon. The plate and DPF material are set upon a turntable for mastering and concomitant analysis. Metalization of the pitted layer is conducted to complete the mastering process. Once such a master is made, conventional electroplating and replication processes are accomplished to make a stamper which is then used for mass duplication of OD's by conventional injection molding processes. The NPR system makes some improvement over the prior art largely due to eliminating etching processing and oven-curing but it does not eliminate motion sensitivity nor the need for expensive and complex translator mechanisms, a high power water cooled laser, and the glass reconditioning processes. Capital expense for such systems is still substantial, and the cost to produce a single master is still relatively expensive. Yet another mastering process is referred to as a direct metal mastering (DMM) process. In the DMM process, instead of using a laser to either expose or cause ablation of the surface material, a tiny diamond stylus actually engages the surface, usually metal, and gouges the pits. Although technically feasible, this concept has had no meaningful application in industry because the "no contact" laser systems offer inherent increased reliability, longevity and efficiency over mechanical systems.

A major objective in recording optical disc masters is to control the geometry of the pits used to record data on the disc. Poor pit geometry makes the separation of duplicate discs from the disc stampers difficult. Also, data transmission can be affected by pits having raised areas surrounding the pit called berms. Berms are a common result of the dry process formula (DPF). An ideal pit is one formed with a complementary, relatively flat surrounding area. Much modern research and development has been devoted to creating recorded optical discs having ideal pit shapes. However, some of the conventional techniques, discussed above, have not developed a manner of recording optical discs without generating the variable and substantial berm areas surrounding the pits used to record data.

Applicant's earlier inventions covered under U.S. Pat. No. 5,283,159 and U.S. patent Pending Ser. No. 648,532 addressed improved pit formation and the berm build up problem in optical disc mastering by application of a semi transparent, very thin, metallic, thermo conductive layer for dissipation of heat accumulation around a pit at the moment of pit creation followed by UV radiation of the recorded surface. With less heat build up and concentration around a pit, there tended to be less berm variability and with subsequent UV radiation there tended to be less berm elevation; however, even with heat dissipation, there remains some elevation and variability in berm build up surrounding each pit that needs improved size reduction and uniformity to achieve universal readability and playability on subsequent replicated optical discs.

As can be seen from the foregoing discussion, the prior art possesses inherent limitations, and there continues to be a long standing need for a more efficient, less time consuming, and less expensive method for manufacture of an OD Master, that is effective in accurately controlling pit geometry for increased readability and playability. The invention disclosed herein does just that.

SUMMARY OF THE INVENTION

The invention is a method and apparatus useful in recording data on and in the manufacture of optical discs, wherein, laser tracking is improved and pits, used to record data, have their geometry and berm buildup controlled in a simple, effective and inexpensive manner. The invention utilizes an optically transparent, e.g. polycarbonate or glass, disc substrate having an optical tracking groove molded or etched on a side thereof. An optically active lamina, consisting of a nitrocellulose dye polymer, is spin coated over the entire grooved side of the disc. The active lamina is encoded with data by laser means configured to focus a data modulated beam along the tracking groove causing ablation and consumption of the optically active lamina. A conventional low power, high frequency laser can efficiently and effectively track along the high point of the groove, i.e. the "land", or more generally along the low point of the groove, i.e. the "valley" and along the floor of a pit formed in the valley of the optically transparent disc due to normal optical feedback received from the optically active layer. Data pits are recorded along the valley of the spiral tracking groove and data is read by interpretation of laser transitions into and out of a pit, read as a "1". Tracking along the valley and along the pit bottom is interpreted as a series of "0" in time.

The desired pit size and geometry is achieved by selecting an appropriate laser power in conjunction with the thickness of the optically active layer and the amount of dye added to the dye polymer nitrocellulose solution; increased dye additive increases laser absorbtivity, which in turn increases active layer ablation, pit size and shape. The laser is configured to be focused on a point or track of the spiral of the optically active lamina with sufficient focus and intensity to create sufficient heat to ablate a pit area in the optically active lamina. With more powerful state of the art lasers, and increased application of dye in the dye polymer solution it has been demonstrated that very accurate pits with reduced berms can be created without the conventional semi reflective layer of the prior art. A primary element of this invention deals with elimination of the prior art requirement for a reflective or partially reflective layer.

An ideal pit is one that has limited variability and very low elevation of berms or raised areas immediately surrounding the pit. The cause of these berms is not positively known, although it is thought that these berm raised areas are caused by a failure to ablate all of optically active lamina from the circumferential portions of desired pit area or due to heat build up around the periphery of each pit. The final step of Ultra Violet (UV) treatment of the reactive layer is then utilized to further reduce berm areas. After data is recorded, I.e. after pit creation, the reactive layer is subjected to one or more passes under or through a high intensity UV light. The UV curing step tends to level out if not totally eradicate the undesirable berm typically associated with laser pit formation.

OBJECTS OF THE INVENTION

It is a primary object of the invention to increase data recording and reading reliability as well as decrease optical disc fabrication costs by making a single layer optical disc.

It is also an object of the invention to make a simple, effective and economical method of controlling the size and shape of the pits formed on optical discs to record data.

It is another object of the invention to substantially attenuate, flatten, and totally eliminate berm buildup surrounding recorded pits of information by means of a single optically active lamina.

Another object of the invention is to provide a fast and inexpensive method of recording data in a controlled manner on optical discs.

Another object of the invention is to disclose an OD mastering system capable of improved pit geometry and increased laser tracking that uses commercially available optical head, laser means and optically transparent substrate to avoid the need for expensive capital equipment found in prior OD mastering systems.

Another object of the invention is to provide improved pit formation on optical discs by increasing the tracking and focusing potential for disc substrates such that a data modulated laser beam may accurately be focused upon and radiate from either side of the disc and cause improved consumption, ablation and sublimation of the optically active layer.

Yet another object of the invention is to lower operating expenses encountered in producing an optical disc recording or an OD master having an ideal pit geometry and increased laser tracking.

It is still a further object of the invention to create an optical disc, used for optical disc mastering, that is easier to manufacture and track upon, and that can be recorded upon and read from either side of the disc.

Yet another object of the invention is to make a very simple disc master with a single optically active layer applied to a disc substrate, thereby eliminating any metallic reflective layer.

These and further objects of the invention will become more readily apparent and obvious in view of the attached drawing, and description of a preferred embodiment, in light of the appended claims.

BRIEF DESCRIPTION OF THE DRAWING

FIG. 10 series illustrates in detail the entire optical disc mastering system including the UV curing step of the present invention as follows:

DETAILED DESCRIPTION OF A PREFERRED EMBODIMENT

The following description is provided in order to enable any person skilled in the arts of optical disc mastering and optical disc recordings to make and use an embodiment of the invention, and sets forth the best mode contemplated by the inventors for carrying out the invention. The invention as disclosed herein can be used with a variety of embodiments. There are three categories that determine the various embodiments that can possibly be used with the invention. The first category concerns optical tracking paths. The present invention can be embodied on optical recording disc substrates with a raised optical tracking path as well as those that are flat and without any tracking path. The specific embodiments necessary for systems that record optical disc masters using discs substrates having an optical tracking path differ from those systems that record on disc substrates with no optical tracking path. The second category relates to recording data on either a first (external lamina/layer) surface or a second surface of the optical disc. Here, the present invention is useful in systems that focus a laser directly on a first surface upon which laser light is incident as well as for systems that focus laser light through the disc on a second inner lamina/layer surface to record data. The third category relates to systems employing a glass disc substrate instead of those that employ a plastic disc substrate.

Again, the invention is useful in embodiments employing either a glass or plastic substrate. The various combinations of these three categories yields eight (8) types of embodiments that are possible with the present invention. Only those embodiments most preferred by the inventors shall be discussed herein. However, it should be readily apparent that the invention applies to optical recording systems within each of the eight categories, and that various modifications of the specific embodiments disclosed herein will be obvious to those skilled in the above referenced arts, since the principles applied by the present invention are generic to all eight types of embodiments.

Figure 1:
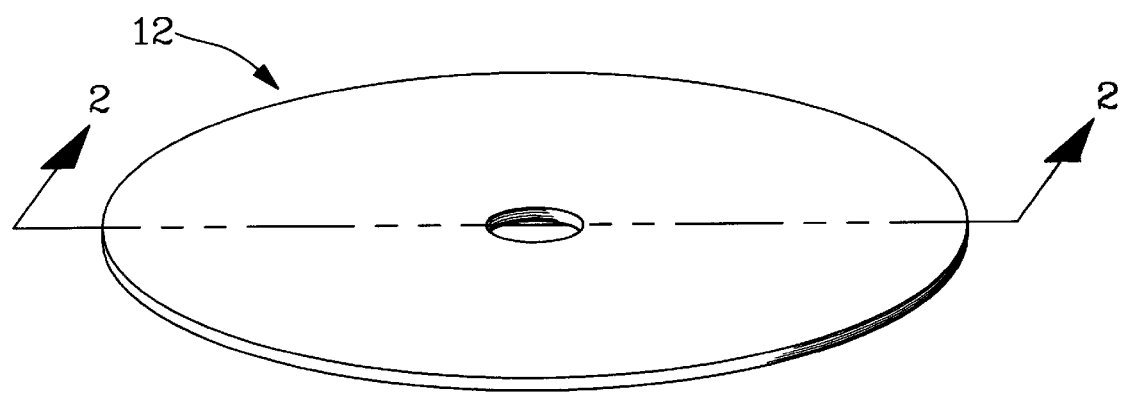
FIG. 1 illustrates a perspective view of a typical disc as used in the invention.
Figure 2:
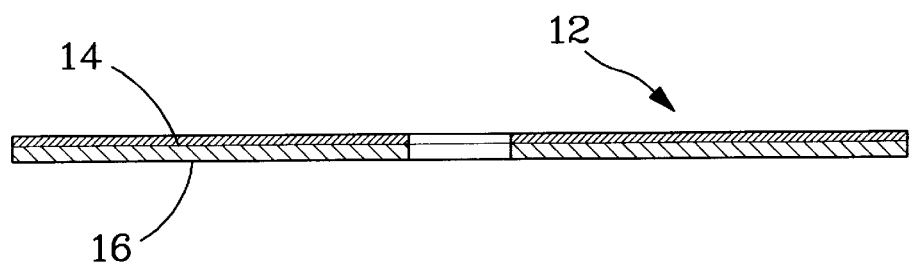
FIG. 2 is a cross sectional view of the disc shown in FIG. 1 along the disc diameter.

Referring now to FIG. 1, an illustration of an optical disc 12 is typical of an unrecorded optical disc manufactured according to the concepts of the present invention. FIG. 2 illustrates a cross-sectional view of FIG. 1 and disc 12 along the plane defined by the diameter, and displays the two layers on disc 12 that constitute the present invention. An optically active layer 16 is spin coated over a polycarbonate disc 12. In the preferred embodiment, the active layer is a Nitrocellulose dye polymer compound; however, it can be appreciated that other alternative active solutions and layers may also be applied. In addition, it is conceived that the active layer is spin coated over a surface of the disc having a pregrooved spiral tracking groove molded therein; however, it can likewise be appreciated that a similar active layer may be disposed over a flat, planar substrate as well, i.e. a disc substrate without a spiral tracking groove.

Optically active lamina 14 is used to store data on optical disc 12 as pits formed within optically active lamina 14 as a result of irradiation from a very high frequency laser light. The use of an optically active lamina 14 to store data in an optical disc is well known to art of optical disc mastering.

The presence of a reflective layer of the prior art does assist in the formation of pits within an optically active lamina by reflecting laser energy to further concentrate the laser intensity at a point where a pit is to be recorded; however, the metallic, reflective layer also acts as a heat sink to concentrate and distribute heat energy to other areas not desired. By such heat transfer, uneven pit shapes are encountered and the excessive heat accumulation also tends to build up berms around the pit surface. It has been found that by substantially increasing the dye density in the nitrocellulose dye polymer active layer, a greater, more homogeneous and smoother laser heat absorption can be effected, thereby eliminating the prior art need for a reflective layer to concentrate the laser energy.

By elimination of the excess step of applying a reflective layer, pits can be formed that are ideal in shape, having little or no raised areas surrounding the pit, but instead, have virtually all of optically active lamina 14 removed from the pit target area by a combination of ablation, consumption and/or sublimation. These ideal pit shapes are especially useful in mass production of duplicate optical discs from the resulting optical disc master due to the attenuation if not total elimination of the raised "berm" areas surrounding the pits which would otherwise cause complications in the manufacturing process.

Figure 5:
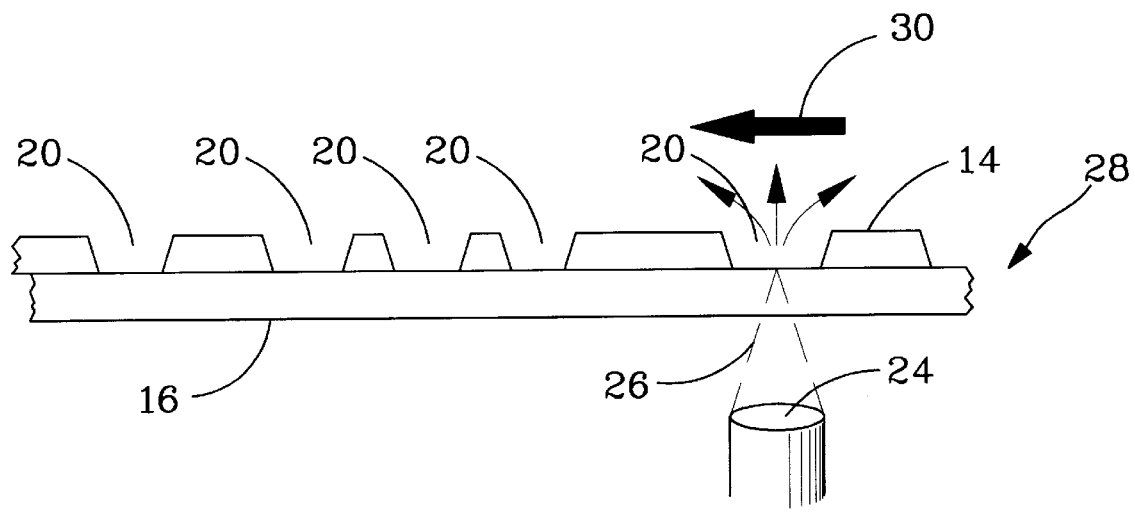
FIG. 5 illustrates the system used to record data on optical discs as envisioned within a first embodiment of the invention by recording through the transparent disc substrate from below the spinning disc.

Disc substrate 10 can have either an optical tracking path molded in, etched on the writing surface or may simply be a flat/planar disc depending on the specific embodiment. Disc substrate can be either transparent polycarbonate, a transparent polymethylmethacrylate (PMMA) or any other transparent substrate capable of carrying a tracking path. Glass would suffice for those embodiments employing an optical tracking path. Transparency of disc 12 is not an essential ingredient to the present invention in those embodiments where recording is accomplished by focusing a laser on the first surface of the disc to record data. Conventional mastering techniques used in the optical disc industry write to optical disc surfaces without focusing through the disc substrates. The present invention is equally useful for those conventional systems as well as embodiments where the laser focuses through transparent disc substrate 16 and onto reactive layer 14 as illustrated in FIG. 5.

Figure 3:
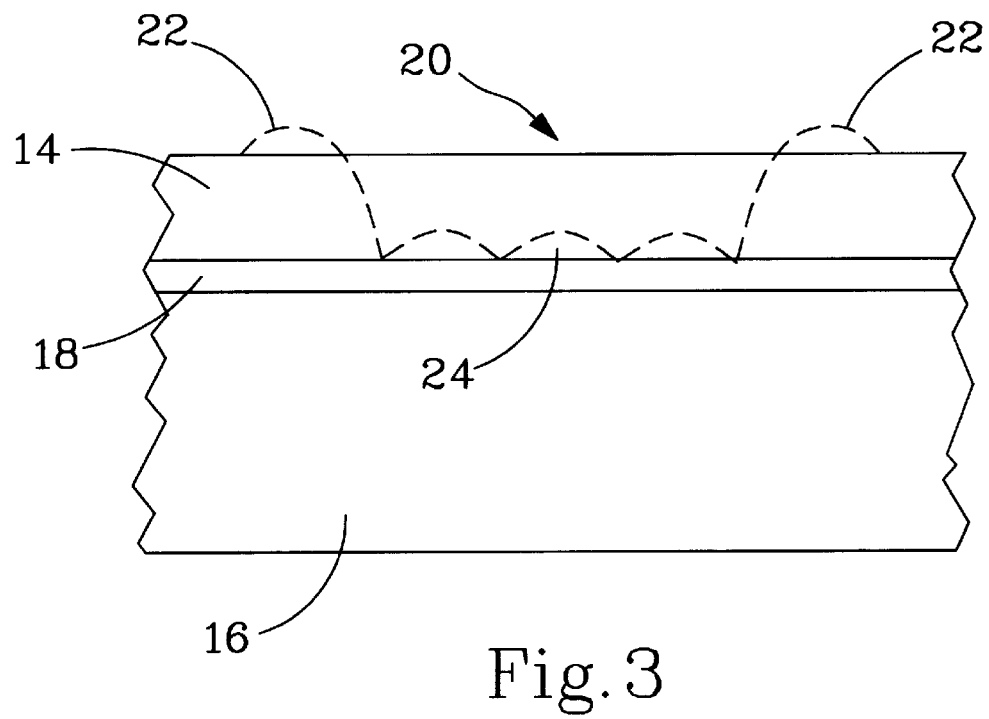
FIG. 3 illustrates a cross section of a portion of a prior art disc conventionally utilizing a reflective layer and yielding undesirable unsymmetrical pits with substantial berm build up.

Referring now to FIG. 3, a diagram of pits created using conventional disc mastering techniques employing optical disc substrate 16 having a partially reflective layer 18, and an optically active lamina 14 applied to the disc surface. The pits 20, indicated by the dotted line, that result from laser irradiation of optically active lamina 14 tend to have berms 22 surrounding the pit 20 and uneven boundaries 24. These berms and uneven, unsymmetrical boundaries result in undesirable problems in laser tracking and especially in reproducing the recorded disc that has these defects. Berms and unsymmetrical boundaries in a master disc create a situation where it is difficult to separate the duplicate copies from a mold, which in turn makes mass production difficult.

Figure 4:
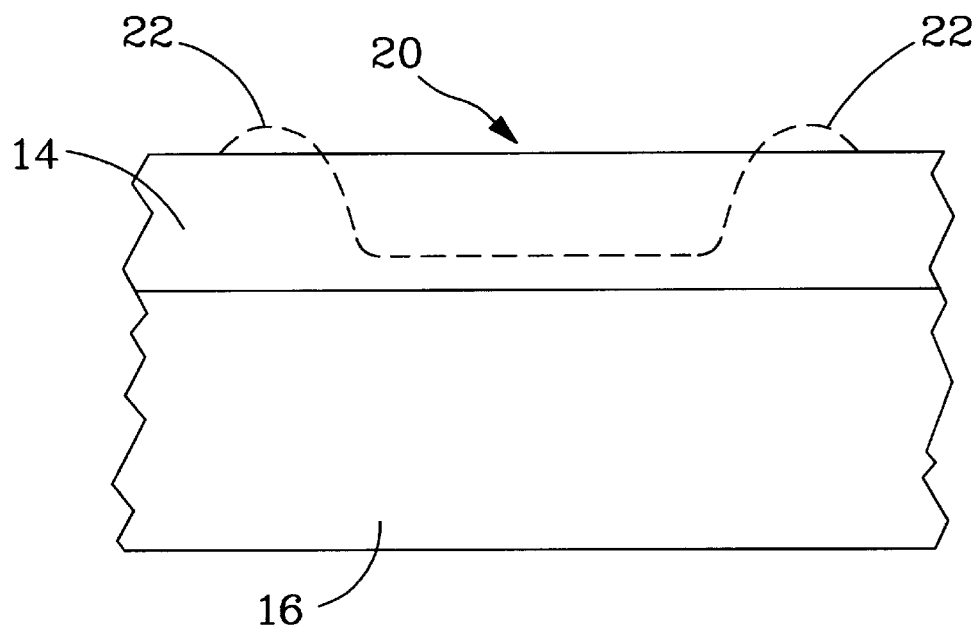
FIG. 4 illustrates a cross section of a portion of a disc of the present invention, without a reflective layer, and resulting in smooth and symmetrical pits with nominal berm build up after UV radiation treatment.

The concept of the invention delineated herein is illustrated as seen in FIG. 4 where a single optically active layer 14 is deposited directly to the polycarbonate substrate disc 16 without any sandwiched heretofore applied metallic, reflective layer. The typical laser recorded pit 20 in FIG. 4, indicated by the dotted line, within optically active lamina 16 can now be evidenced to have a nominal, if any, berm 22 development and a much smoother and symmetrical form in what is widely considered throughout the industry as a preferred pit shape. The only difference in the structure of this disc compared to conventional mastering techniques discussed above is the absence of the partially reflective metallic layer 18 of FIG. 3 and an increase in the concentration of dye in the optically active nitrocellulose dye polymer solution.

The nitrocellulose dye polymer solution utilized in the present invention consists of a solvent comprising approximately 95% Butyl Cellosolve (BCS) and 5% Methanol, with a 5% solute to 95% solvent ratio, wherein the final dye polymar coating layer on the disc consists of approximately 97% Nitrocellulose and 3% dye. It is believed that, without the typical metallic layer, and with an increase of dye in the dye polymer, more laser generated heat is absorbed more evenly within optically active lamina 14 to yield cleaner data pits. Cleaner data pits without berm gives rise to much higher yields of disc from a disc master and substantially decreases the Block Error Rate (BLER). Because the heat energy tends to be more evenly distributed in and around the pit periphery itself, a more even distribution of heat energy and respective ablation the optically active layer is achieved. Although the partially reflective layer 18 tended to act as a heat barrier to prevent heat generated from escaping into disc substrate 16, it also acted as a heat sink to accumulate too much heat in a confined area which tended to create microscopic explosions in the bottom of the optically active layer which in turn tended to create an uneven, unsymmetrical pit boundary and more accumulated debris. However, even with the deletion of reflective, heat conductive layer 18, the ablative thermal process of creating pits 20 will still tend to create a residual berm 22 along the pit edge.

Therefor, a necessary and additional step of this invention includes irradiating the active layer 14 with ultra violet (UV) light after the data pits are recorded by laser means in the active layer 14 and before addition or application of any subsequent layer such as the vapor deposition of an electroconductive layer such as Silver or Nickel to effectively complete the disc master process. The UV irradiating and reflowing process is performed by passing the recently recorded disc with the exposed active layer 14 face up, i.e. facing the UV illumination, and lying on a conveyer belt that will carry the disc under or through a UV light for one or more passes. The UV irradiating and reflowing process can be performed by application of a Porta Cure Model 1000F at 120V and 230V or a Porta Cure Portable Mini that can be purchased from American Ultraviolet of Santa Ana, Calif. The Mini model utilizes a portable mini UV source at 185 to 400 nanometer UV wavelength with a bulb length of 6 inches and power of 200 watts per linear inch. The disc is carried by a conveyer belt moving at 10 feet per minute and at a distance of approximately 5 inches under the UV light. At this power and settings, it is necessary to make 4 to 5 passes of the disc under the UV source while turning the disc one quarter turn on each successive pass to effectively reach a required "transition point" to sufficiently soften but not totally melt the surface of the active layer and thereby lower and totally eliminate the berm build up. Not reaching the transition point will not soften the active layer sufficiently enough to eliminate the berm, and going past the transition point will melt the active layer sufficiently enough to destroy the pit entirely.

Once data is fully recorded in the optically active layer 14 of a disc and the foregoing UV irradiating and reflowing process has been implemented, the OD Master is completed by the last step of vacuum deposition, or other equivalent process, wherein a thin layer, approximately 1000 angstroms (A), of an electrically conductive substance is placed over the optically active lamina 14 of the disc 12 of FIG. 1. In the preferred embodiment the lamina 30 is silver (Ag). Upon completion of the metalization process step, the resultant OD Master can then be electroplated by conventional means to form a stamper for replication of many identical discs.

A first process of the preferred embodiment of the invention is illustrated in FIG. 5, wherein data is recorded on a disc master by means of a disc spinning above an optical head and lens 24 with laser beam 26 passing through disc substrate 16, which in this embodiment is a transparent polycarbonate material, to irradiate upon the optically active lamina 14. The data modulated laser 24 actually moves slowly outward along a radial of the disc from the center of the disc to the outer periphery; however, the laser head 24 appears to be stationary relative to the spiral track 28 moving in the direction 30 over the ostensibly stationary laser head 24 to create a series of data pits 20. This orientation is a second surface type of orientation that is typically used in reading prerecorded Compact Discs (CDs), and reading and writing with Write Once Read Many (WORM) discs. However, the present invention writes to optical discs in a novel manner which can then be used in making a first article master disc for CD's. Conventionally, first article master discs are created by focusing a laser on the first surface of the optical disc rather than focusing a laser through the disc to write on the second surface.

Figure 6:
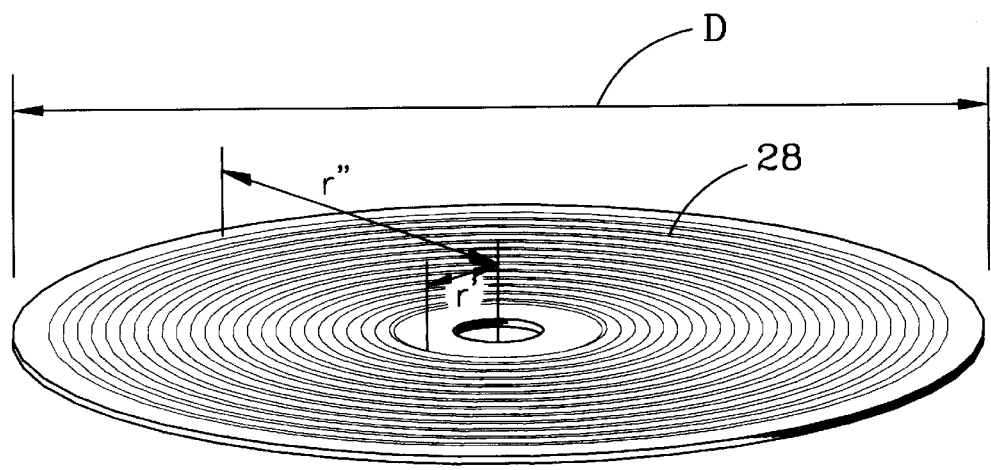
FIG. 6 illustrates a disc used in accordance with the first preferred embodiment of the invention.

The embodiment shown in FIG. 5 employs a disc as shown in FIG. 6 that has the spiral groove tracking path 28 created upon the writing surface of polycarbonate disc substrate 16. Optically active lamina 14 is made from a nitrocellulose material containing an optically active dye compound. Without the dye polymer additive the nitrocellulose is optically transparent. Here, the invention has many advantages. Optical head 24 focuses laser 26 on optically active lamina 14 causing the absorption of energy and a corresponding generation of heat. Conventional techniques rely on a dye polymer within optically active lamina 14 to generate heat and as a result pits 20 created using these conventional methods tend to have raised berm 22 areas surrounding the pits. However, the present invention uses the increased dye polymer within optically active lamina 14 to generate and better control the heat used to create pits 20 that are ideal in shape and that have no raised berm areas.

Optical head 24 situated below disc substrate 10, causes laser beam 26 to pass through disc substrate 16, and to finely focus on the junction area between disc substrate 16 and optically active lamina 14. The nitrocellulose dye polymer compound in optically active lamina 14 absorb laser light resulting in the production of substantial heat energy in optically active lamina 14 which in turn generates a rapid chemical reaction in optically active lamina 14 which thereby consumes, ablates and sublimates a microscopic portion of lamina 14 to form pits 20. Optical head 24 is tangentially stationary, yet the spiral tracking path 28, indicated by arrow 30, is moving relative to optical head 24 in FIG. 5, enabling a series of data pits 20 to be recorded thereon. Optical head 24 moves radically outward in a straight line from the center r' to the periphery r" of the optical disc illustrated in FIG. 6, while tracking spiral tracking path 28 and the disc spins at a steadily declining rate to maintain a constant linear velocity (CLV) of approximately 1.2 meters per second for a point on the surface of the disc that is being irradiated by laser focused laser 26.

Figure 7:
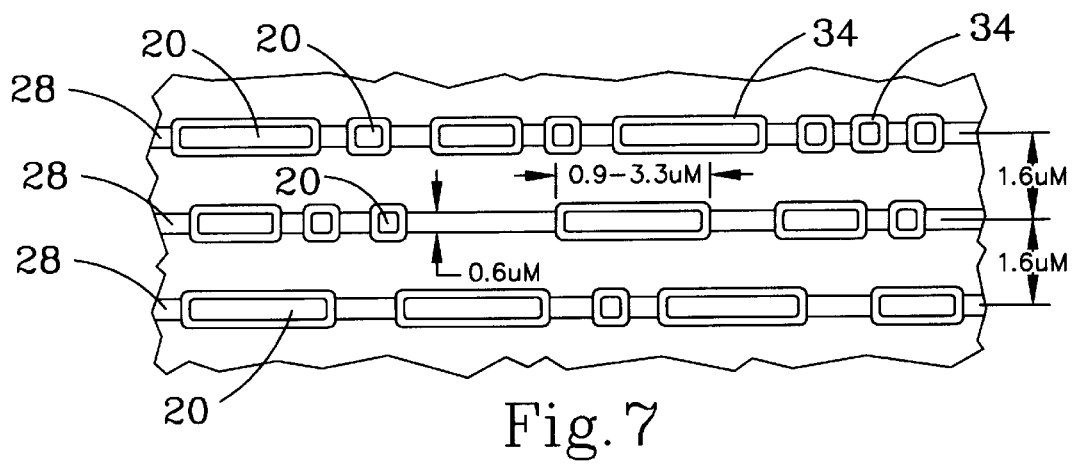
FIG. 7 is a magnified top, plan view of the grooved side of the disc of FIG. 6 illustrating recorded pits within the optically active lamina of the optical disc.

FIG. 7 illustrates a top view of data recorded along spiral groove tracking path 28 as indicated by ablated pits 20 which typically are ¼ of a laser wavelength deep, 0.6 um wide and 0.9 to 3.3 um long. The variance in length represents data recorded in CD format as channel bits in lengths commonly termed 3T to 11T, which represents the run length limited (RLL) code of recorded data. For tracking purposes of a typical 780 nanometer (nm) wavelength laser it is desirable that the resulting groove 11T be in the realm of ⅛ of a laser wavelength or 975 A Actually groove 11T would be approximately 650 A; 975/1.5=650 when the difference of index of refraction (1.5) is taken into account.

Figure 8A:
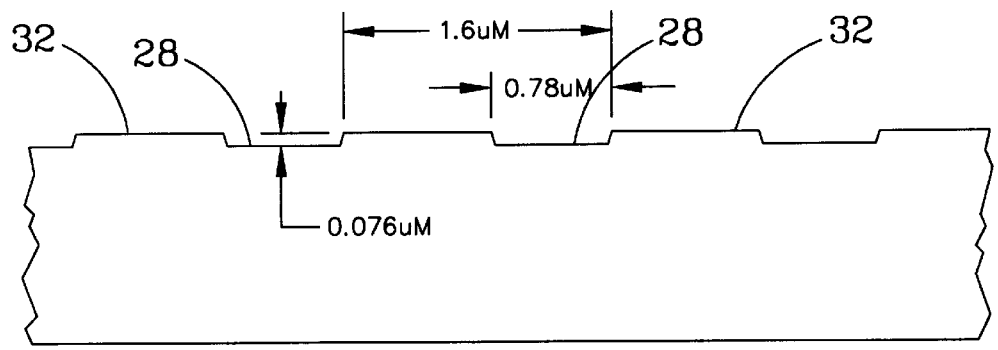
FIG. 8a is a magnified cross section of a portion of a diameter of FIG. 6 illustrating the groove dimensions; i.e. the high, land and low, valley areas of the spiral tracking groove as used in the present invention.

FIG. 8a is a magnified view of a cross sectional area of the disc of FIG. 6 displaying spiral groove tracking path 28 on edge in sufficient detail to discuss the relationship between the geometry of tracking path 28 and the creation of pits 20 used to record data. The dimensions of tracking path 28 and the resulting pit 20 are nominally as indicated in FIG. 8a discounting the possibility of any nominal residual reactive lamina not ablated. Preferably, although not necessarily limited thereto, spiral groove tracking path 28 has a width equal to 0.78 um, a depth being equal to 0.076 um and track pitch, i.e. the distance, including the groove "valley" 28 and the "land" 32, between successive tracks or grooves, equal to 1.6 um. For a 780 nm laser, these tracking dimensions will yield a pit of approximately ¼ of a laser wavelength deep.

Figure 8B:
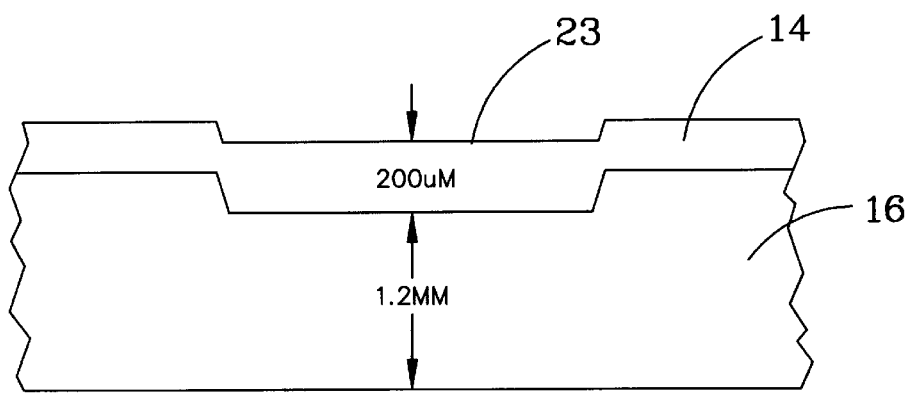
FIG. 8b is an exploded view of a grooved area of FIG. 8a displaying the unique single active layer on top of the transparent disc substrate used in the invention.

Referring to FIG. 8b, an even greater magnification of FIG. 8a tracking groove 28 on edge illustrates an optically active layer 14, approximately 200 nm to 230 nm thick, consisting of a nitrocellulose compound having a dye polymer solution sensitive to the recording laser's wavelength.

Referring now to FIG. 8A in conjunction with FIG. 8B, the geometry and dimensions of pits 20 formed on spiral tracking grooved 28 surface imprinted on the optical disc can be formed to approach the shape of the tracking path 28. The dimensions of tracking path 28 can be determined by various means customary in the art, including, mechanical/physical etching, photo resist etching and even continuous ablation of a laser by means of a continuous wave (CW) laser beam. Predictable results are obtained by operating within the confines of the tracking path 28 to create pits 20. Usage of tracking path 28 assists in obtaining the desired path and pitch for recorded data. The control of pit geometry results from the conjunctive variance of the thickness of optically active lamina 14 with laser power focus and wavelength and the amount of Nitrocellulose dye polymer solute. By having a laser focus on the area defined by optically active lamina 14, heat is generated consistently throughout the target area. The affect is that none or very little of optically active lamina 14 remains within the area of tracking path 28 that has been subjected to laser irradiation. Pit formation leaves only the grooved walls 34 of FIG. 7 or a nominal residual layer of optically active lamina 14, with essentially no surrounding berm 22 area, yielding pits that are ideal to shape.

The optical laser head 24 used in the foregoing process is preferably a 780 nm wavelength laser, although another wavelength laser could be used, mounted in an optical head which has a single spot tracking capability. It should be understood that different laser wavelengths would dictate different groove and pit geometry. The optical head 24 has a lens with a numerical aperture of 0.6 such that the laser may be focused to a spot on tracking path 28 which spot has a diameter approximately equal to the width 0.7 um of the groove when laser beam 26 passes through polymer substrate 16. Once the lens is focused, optical tracking path 28 provides a means by which optical laser head 24 can track on the optical disc and follow the spiral tracking path 28 necessary for optical disc encoding. The operating a system utilizes conventional servo means to adjust the speed of the spinning disc to the radial translational movement of optical head 24 in such fashion that laser beam 26 is able to follow the spiral tracking path 28 with a constant linear velocity (CLV) from the inner most groove radius (r') to the outermost groove radius (r") of FIG. 6.

The laser diode used in the invention is a diode having sufficient power to ablate the optically active lamina 14. The diode during recording is modulated with the desired data stream and by such means forms the series of ablated pits 20 of various length aligned along tracking path 28.

Figure 9:
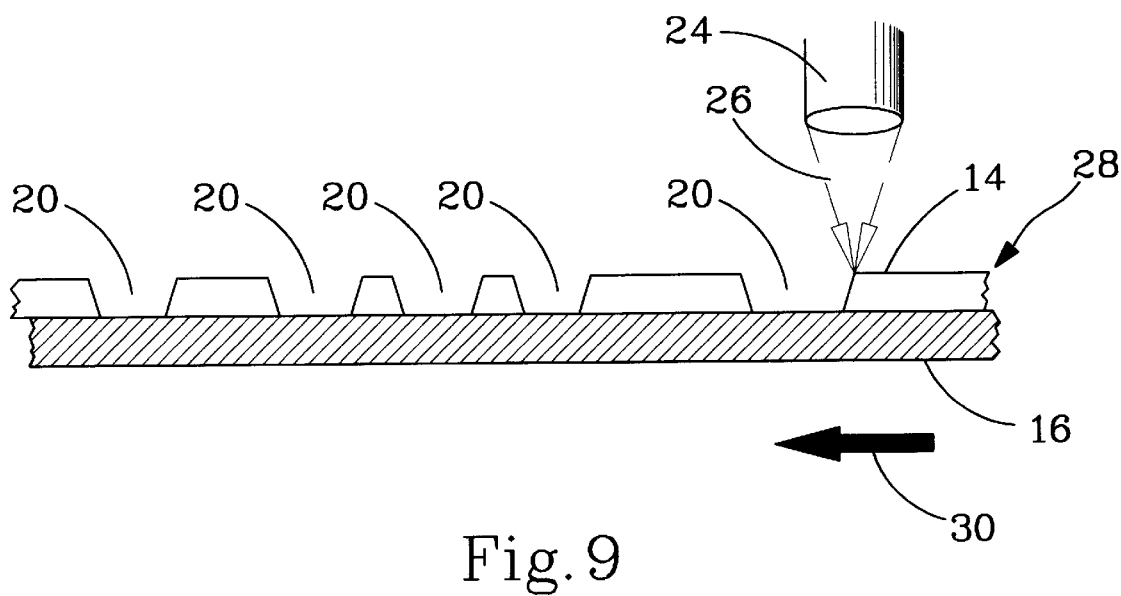
FIG. 9 illustrates the system used to record data on optical discs as envisioned within a second embodiment of the invention by recording on the active layer directly from above the spinning disc without passing through the transparent disc substrate.
Figure 10A:
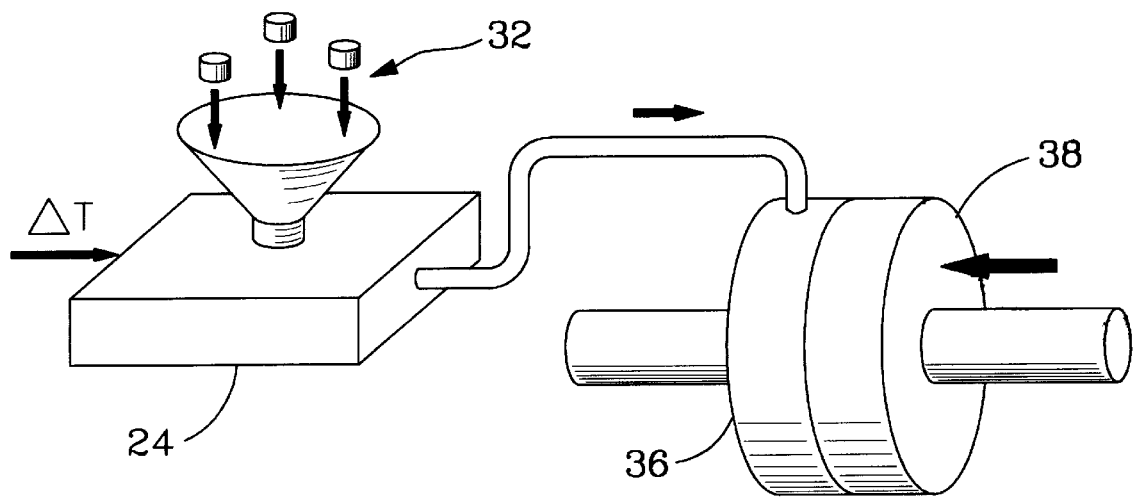
FIG. 10a step of compression molding transparent disc substrates.
Figure 10B:
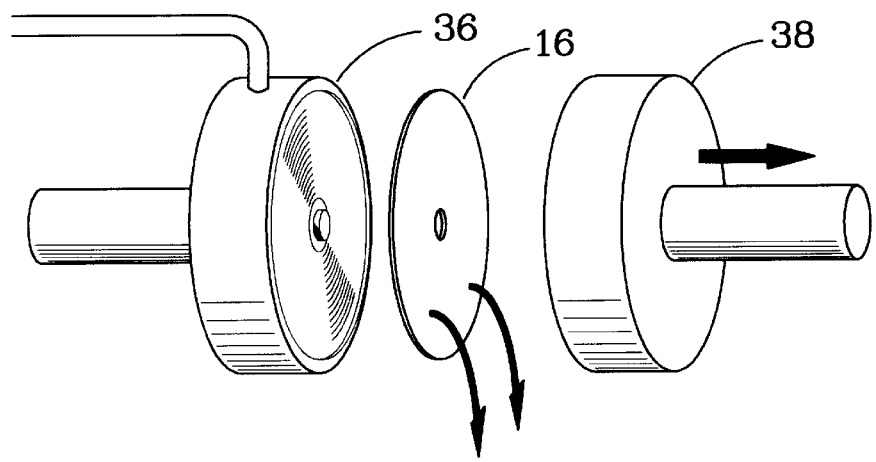
FIG. 10b step of separating mold to release disc substrate with embossed tracking groove.
Figure 10C:
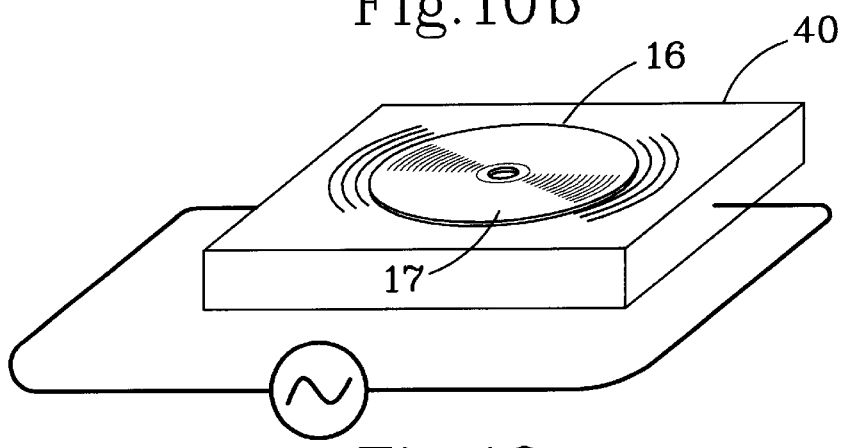
FIG. 10c step of clean room plasma process to agitate and remove impurities.
Figure 10D:
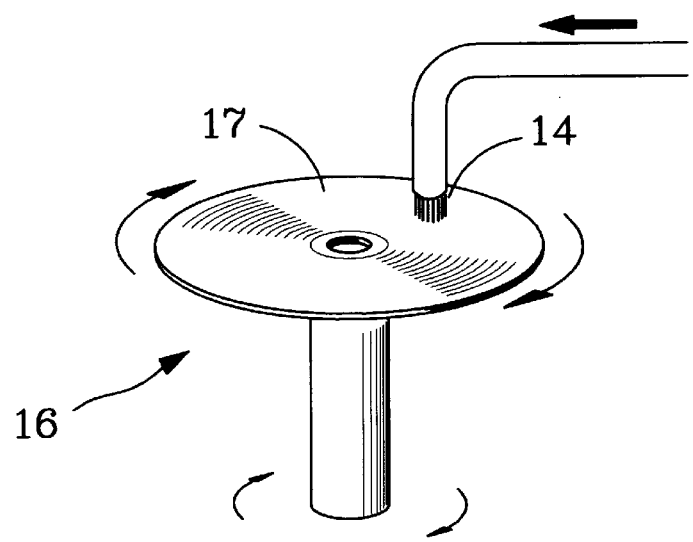
FIG. 10d step of spin coating optically active, nitrocellulose, layer.
Figure 10E:
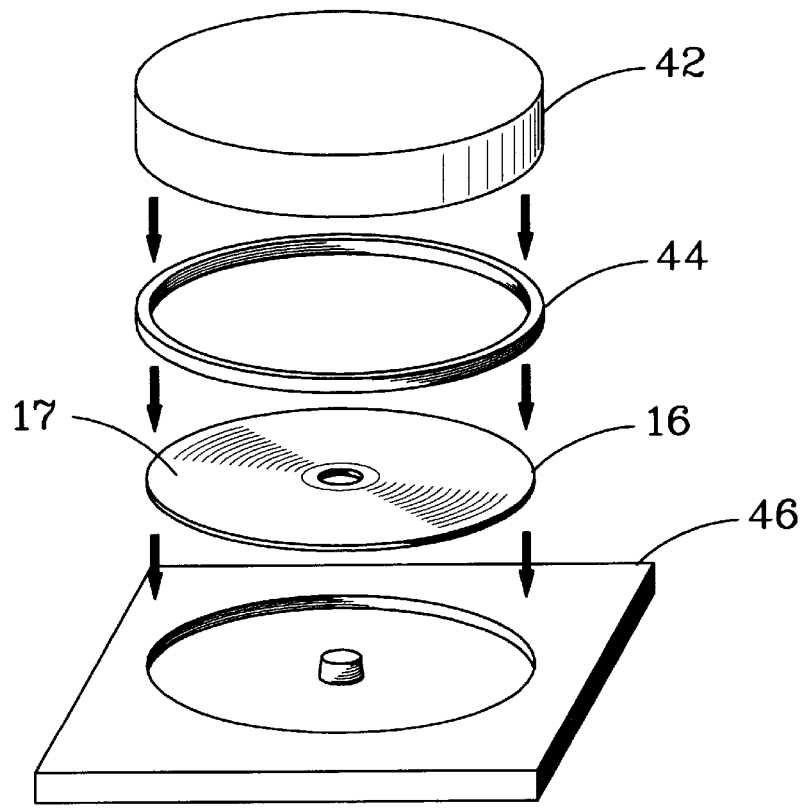
FIG. 10e step of applying a sealed cover to active side of disc.
Figure 10F:
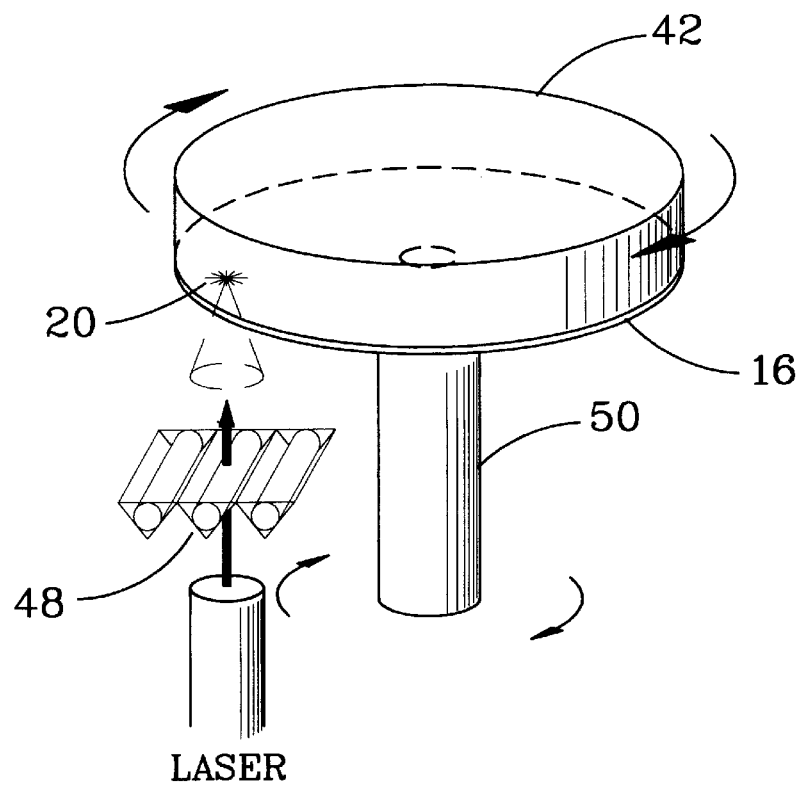
FIG. 10f step of recording data by laser means under the spinning disc.
Figure 10G:
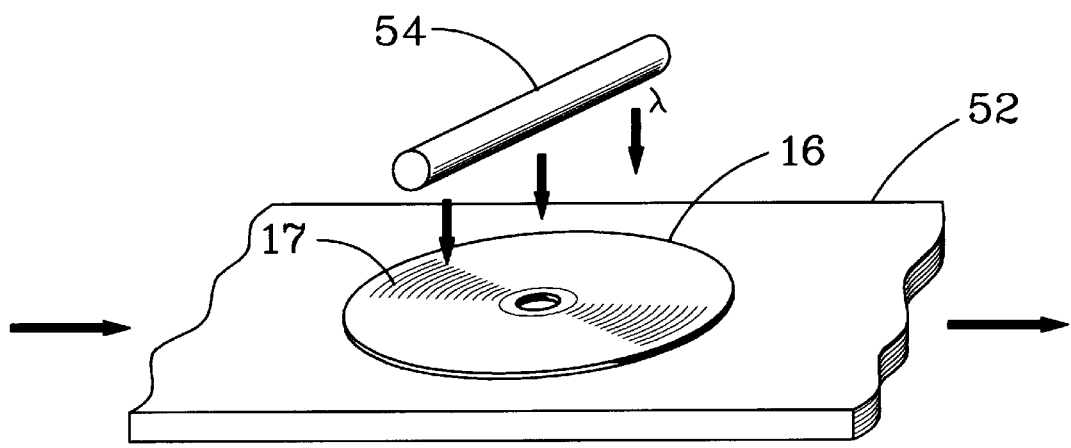
FIG. 10g step of UV treatment of recorded pits to remove or eliminate excessive berms.
Figure 10H:
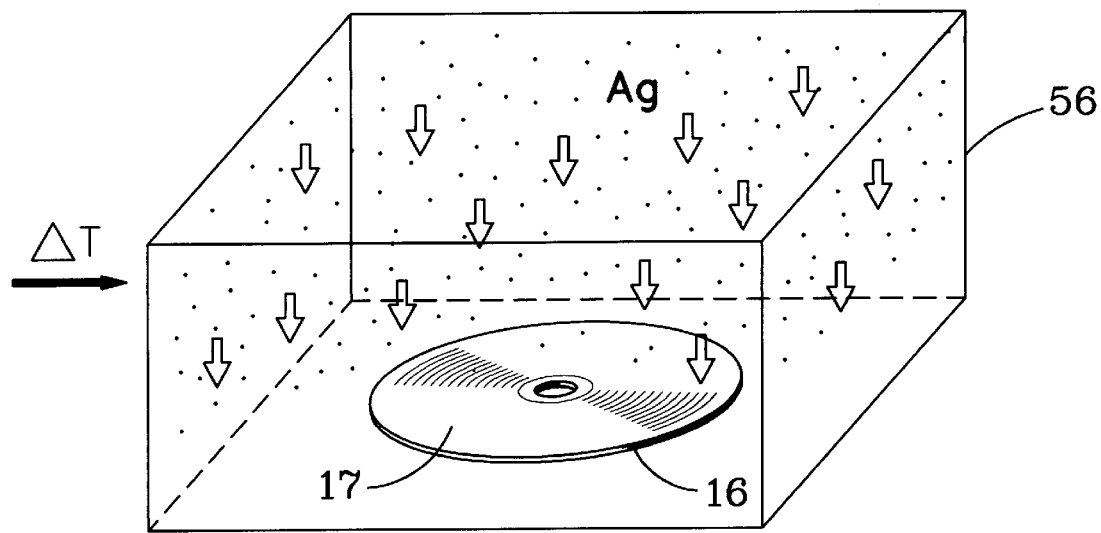
FIG. 10h step of vapor deposition of metallic, conductive, silver, layer to yield an OD master.
Figure 10I:
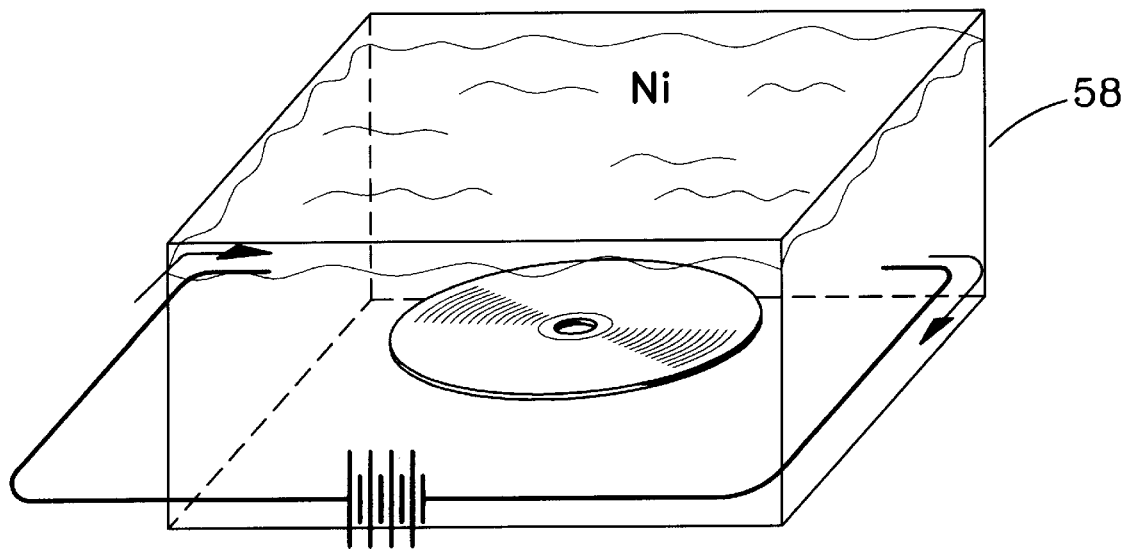
FIG. 10i step of electroplating a nickel layer to form a stamper for multi disc production.

A second preferred embodiment of the invention as shown in FIG. 9, illustrates data recording by means of a disc spinning below an optical head 24 with laser beam 26 focusing on optically active lamina 14 from above the disc. This configuration is similar to those used in conventional disc mastering techniques, and similarly employs a disc substrate 16 made from highly polished glass, having one side used as a writing surface. Optically active lamina 14 is deposited in a uniform layer on the disc substrate 16 as above. As can be seen there are similarities between this embodiment and the first embodiment in terms of the layers used to construct the disc; i.e. the layers are identical. However, the second embodiment employs a glass disc substrate 16 with laser beam 26 focused from above disc onto disc surface where there is no optical tracking path. The second embodiment is, therefore, illustrative of the usefulness of the present invention in conventional systems used to make first surface master discs. By focusing a laser on the first surface of the optical disc rather than focusing through a disc, as in the previous embodiment, the invention is operative within these conventional systems.

Again, as in the first embodiment, optical head 24 focuses laser beam 26 on optically active lamina 14 causing absorption of energy and a resulting generation of heat. This technique relies on the dye polymer concentrate within the optically active lamina 14 to generate heat.

The nitrocellulose dye polymer compound in optically active lamina absorbs sufficient laser light resulting in substantial heat energy in optically active lamina 14 which in turn generates a rapid chemical reaction within optically active lamina 14, which causes consumption, ablation and/or sublimation of optically active lamina 14 to form pits 20. As in the first embodiment, and in accordance with the principles of the invention, the laser beam 26 is distributed within the target area in a manner that results in pits 20 being formed in an ideal manner and that are without berms 22 surrounding pits 20.

A major difference in this embodiment when compared to the first embodiment, is the fact that no optical tracking path exist on the unrecorded disc. The data is recorded in a pattern that can be used as a tracking path for reading of the recorded data by a read laser. To accomplish this, laser source 24 appears stationary to the disc during recording but actually moves radically outward in a straight line from the center to the periphery of the disc while the disc spins at a steadily declining rate to maintain a constant linear velocity (CLV) of approximately 1.2 meters per second for a point on the surface of the disc that is being radiated by laser beam 26. Pits 20 can be recorded in a preferably spiral manner.

OVERVIEW

In an effort to provide an overall summary of the foregoing processes, applicant encloses herewith a description for FIG. 10 which is a detailed visual step by step process for making an optical disc master in accord with the teachings of this patent. FIG. 10a illustrates a perspective view of the formation of the transparent disc substrate 16. Polycarbonate pellets 32 are melted in an oven 34 and forced under pressure into a compression mold consisting of a tracking grooved side 36 and a smooth, planar side 38. FIG. 10b indicates the opening of the compression mold to release a transparent, polycarbonate disc substrate 16. The disc substrate 16 in FIG. 10c is then passed through a plasma process 40 in a cleanroom environment where a high voltage plasma field oxidizes and removes undesired molecules and in so doing lightly etches the grooved side 17 of disc 16 and removes impurities from the disc in preparation for application of subsequent layers. In FIG. 10d, a nitrocellulose dye polymer solution is spin coated onto the grooved side 17 of disc substrate 16 to become the optically active layer 14. FIG. 10e indicates an alternate embodiment or step in lieu of maintaining a clean room environment. In this step a disc cover 42 is applied to the active side 14 of the disc and is removably sealed thereto by a rubber or plastic grommet 44. The sealed and protected disc is then placed in a protective carrying tray 46. FIG. 1 Of illustrates the laser recording process wherein data pits 20 are recorded by a laser modulating an focusing means 48 in the active layer 14 sealed and enclosed in disc cover 42 while both disc an cover spin about a spindle 50. FIG. 10g illustrates the disc master nearly completed with recorded and optically active side face up on a conveyer belt 52 moving from left to right under and through an ultra violet light 54 which irradiates the active surface 14 and thereby further eliminates any residual berm 22 build up. FIG. 10h concludes the disc mastering process by vapor deposition process 56 of an electrically conductive, e.g. silver (Ag), layer. From this optical disc (OD) master an OD stamper is formed in FIG. 10i by passing the disc master through a Galvanic bath/chamber to create a family series by building a nickel layer through an electroforming process 58 to make a "father" having bumps instead of the disc master with pits.

Although the embodiment most preferred by the inventors for making optical disc recordings has been detailed herein above, it should be understood that the invention is not limited thereto, and that modifications to the invention as disclosed herein should be obvious to those skilled in the relevant arts. Therefore, other obvious modifications thereto should be considered to be within the scope of the invention as defined in the appended claims.

What is claimed is:

1. An optical disc for optical disc mastering, comprising:
    a planar disc substrate having a spiral tracking groove premolded thereon; and
    an optically active lamina, comprising a Nitrocellulose dye polymer solution consisting of a solute of Nitrocellulose and dye polymer in a ratio of 97/3 in a colloidal suspension in a solvent of Butyl Cellosolve (BCS) and Methanol in a ratio of 95/5, disposed on said disc substrate, wherein said solute alone remains as the optically active layer upon vaporization of the solvent.

2. A process for making an optical disc master from which an optical disc stamper can be made comprising the steps of:
    forming a planar optical disc substrate having at least one surface for recording data;
    applying an optically active lamina to said recording surface of said optical disc substrate;
    recording data to said optically active lamina by focusing a data modulated laser to form a series of pits in said optically active lamina;
    illuminating said recorded active lamina with ultra violet radiation and thereby substantially eliminating any berm areas around said data pits.

3. The process as defined by claim 2, wherein said step of writing data further consists of focusing a data modulated laser to an area defined by the junction of said disc substrate and said optically active lamina.

4. The process as defined by claim 3, wherein said recording surface has an optical tracking path disposed thereon.

5. The process as defined by claim 4, wherein the step of writing data consists of focusing said laser on said optical tracking path to form said pits.

6. The process as defined by claim 2, wherein said disc substrate is a polymer.

7. The process as defined by claim 3, wherein said laser means is disposed to focus through said disc substrate to form pits in said optically active lamina.

8. The process as defined by claim 2, wherein a final step is added for applying a conductive lamina to said active lamina, to complete an optical disc master for reproduction.

9. In an optical disc mastering system that utilizes the process of:
    1—forming a pregrooved, transparent disc substrate;
    2—applying a lamina of semi-reflective substance to said disc substrate;
    3—applying a lamina of an optically active dye polymer solution to said semi-reflective lamina;
    4—recording data by modulated laser means passing through said transparent substrate and through said semi-reflective lamina to said active lamina to form data pits by ablation of active lamina;
    5—radiating said recorded, active lamina to flatten and eliminate berm buildup prior to application of a conductive lamina;
    Wherein, the improvement comprises the deletion of the second step and increasing the laser absorption of the dye polymer solution in said third step.

* * * * *